(12) United States Patent
Gill

(10) Patent No.: US 11,794,629 B1
(45) Date of Patent: Oct. 24, 2023

(54) SYSTEM FOR MONITORING STRAP TENSION

(71) Applicant: FGILL ENTERPRISES, L.L.C., Sandy, UT (US)

(72) Inventor: Fred Gill, Sandy, UT (US)

(73) Assignee: Fgill Enterprises, L.L.C., Sandy, UT (US)

( * ) Notice: Subject to any disclaimer, the term of this patent is extended or adjusted under 35 U.S.C. 154(b) by 491 days.

(21) Appl. No.: 17/094,616

(22) Filed: Nov. 10, 2020

Related U.S. Application Data

(60) Provisional application No. 62/940,774, filed on Nov. 26, 2019.

(51) Int. Cl.
*B60P 7/08* (2006.01)

(52) U.S. Cl.
CPC .................................. *B60P 7/0861* (2013.01)

(58) Field of Classification Search
CPC ...................................................... B60P 7/0861
USPC .......................................................... 410/96
See application file for complete search history.

(56) References Cited

U.S. PATENT DOCUMENTS

| | | | |
|---|---|---|---|
| 4,992,778 A | 2/1991 | McKeen et al. | |
| 5,960,849 A | 10/1999 | Delaney et al. | |
| 6,847,290 B2 | 1/2005 | Tardif | |
| 7,112,023 B1 | 9/2006 | Tardif | |
| 7,222,839 B2 | 5/2007 | Taylor et al. | |
| 7,339,460 B2 | 3/2008 | Lane et al. | |
| 7,561,034 B2 | 7/2009 | Reichow et al. | |
| 7,972,099 B2 | 7/2011 | Leggett et al. | |
| 8,150,613 B2 | 4/2012 | Engelhard | |
| 8,847,758 B2* | 9/2014 | Eide | G01L 5/102 340/568.1 |
| 10,315,555 B2* | 6/2019 | Bruhn | G01G 19/12 |
| 10,328,841 B2* | 6/2019 | Bika | H04W 4/70 |
| 10,625,658 B2* | 4/2020 | Taylor | G08B 13/06 |
| 11,370,348 B2* | 6/2022 | Ehnimb | G08B 21/182 |
| 2013/0162420 A1* | 6/2013 | Stoddard | B60P 7/0861 340/425.5 |
| 2022/0242302 A1* | 8/2022 | Goetz | B60P 7/0869 |

FOREIGN PATENT DOCUMENTS

| | | | | |
|---|---|---|---|---|
| DE | 102015000101 A1 * | 7/2016 | ............ | B60P 7/0861 |
| DE | 102017120785 A1 * | 3/2019 | ............ | B60P 7/0861 |
| DE | 102018009012 A1 * | 5/2020 | | |
| DE | 102019211419 A1 * | 2/2021 | ............ | B60P 7/0861 |

\* cited by examiner

*Primary Examiner* — Hilary L Gutman
(74) *Attorney, Agent, or Firm* — Thorpe North & Western; Jason R. Jones

(57) ABSTRACT

A method is provided of monitoring a tension in a strap secured about a cargo item on a vehicle. The method includes removably attaching at least a first sensor to the strap, the first sensor capable of determining a relative position of the first sensor and to transmit data relating to said first relative position. Relative position is sensed of at least a second sensor operable to determine a relative position of the second sensor. A position of the first and second sensors relative to one another is compared to monitor a change in position of the first and second sensors relative to one another to monitor a change in tension of the strap.

14 Claims, 3 Drawing Sheets

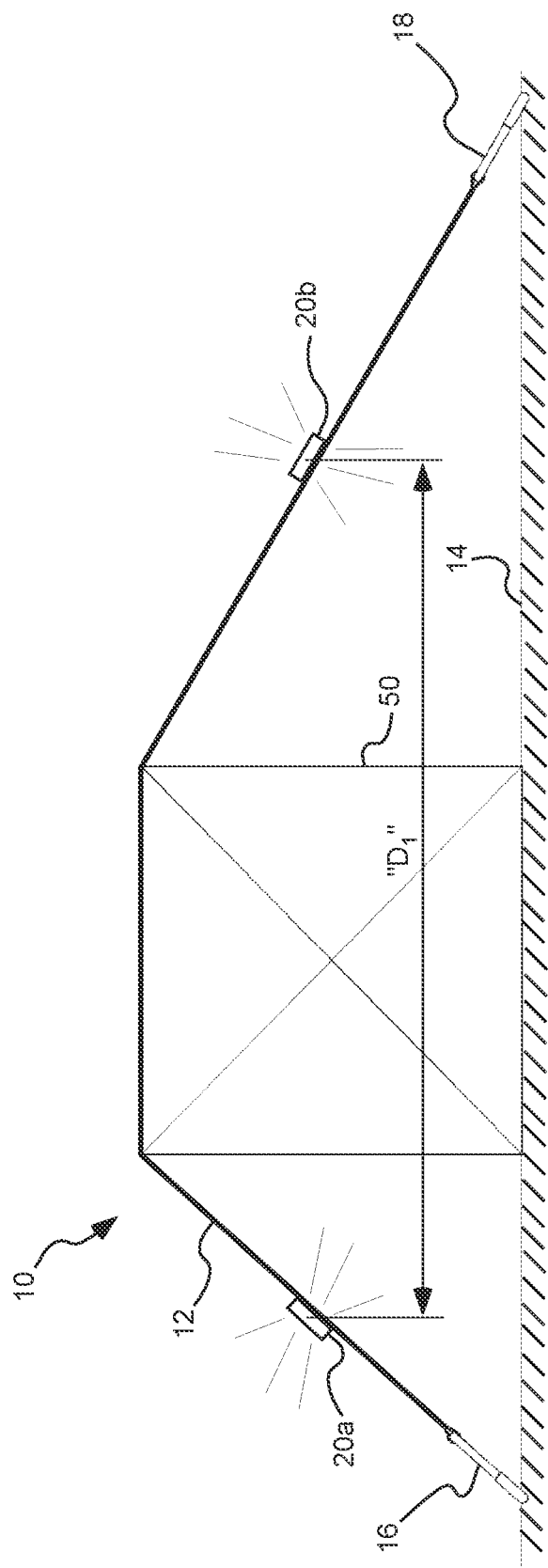

SYSTEM FOR MONITORING STRAP TENSION

PRIORITY CLAIM

Priority is claimed of and to U.S. Provisional Patent Application Ser. No. 62/940,774, filed Nov. 26, 2019, which is hereby incorporated herein by reference in its entirety.

BACKGROUND

Field of the Invention

The present invention relates generally to systems for safely and securely shipping and transporting loads. More particularly, the present invention relates to the use of "tie down" or restraint straps for securing a load for storage or transportation, and monitoring such restraints during transit.

Related Art

Numerous cargo items are loaded and shipped each day in settings such as consumer travel, trucking lines, airline applications, railroad transport and the like. Examples include, without limitation, commercial packages, barrels, crates, vehicles, etc., that are stored on shipping trucks, trains, or aircraft. Additionally, ATVs, motorcycles, camping gear, etc., may be transported on private vehicles on roof racks, truck beds, trailers, etc.

The need for such loads to be well secured is appreciated by anyone with any experience in transporting goods. If any secured item becomes inadvertently dislodged during transport, the results can be catastrophic. If the previously secured item falls from the transport vehicle, the item can cause significant damage to other vehicles on the road, and can itself become damaged.

While a variety of known strap systems have been used to secure such loads, significant problems remain with such systems.

SUMMARY OF THE INVENTION

It has been recognized that it would be advantageous to develop a system that monitors the tension in strap assemblies during the shipping process.

In accordance with one embodiment, a monitoring system is provided that can include a strap restraint monitoring system operable to monitor tension in at least one strap securing a cargo item to an auxiliary structure. A first sensor can be operable to determine a relative position of the first sensor and to transmit data relating to said first relative position. An attachment assembly can be operable to adjustably attach the first sensor to a strap. A second sensor can be operable to determine a relative position of the second sensor. A comparator can be operable to compare a position of the first and second sensors relative to one another.

In accordance with another aspect of the technology, a restraint assembly is provided that can include a cargo item secured to a vehicle with at least one strap. A first sensor assembly can include a first sensor and a first attachment assembly, the first sensor assembly operable to determine a relative position of the first sensor and to transmit data relating to said relative position, the first sensor assembly being secured to the strap by the first attachment assembly at a first location on the strap. A second sensor assembly can include a second sensor and a second attachment assembly, the second sensor assembly operable to determine a relative position of the second sensor and to transmit data relating to said relative position, said second sensor assembly being secured to the strap at a second location on the strap by a second attachment assembly. A comparator can be operable to compare a position of the first and second sensors relative to one another.

In accordance with another aspect of the invention, a method is provided of monitoring a tension in a strap secured about a cargo item on a vehicle. The method can include: removably attaching at least a first sensor to the strap, the first sensor capable of determining a relative position of the first sensor and to transmit data relating to said first relative position; sensing relative position of at least a second sensor operable to determine a relative position of the second sensor; and comparing a position of the first and second sensors relative to one another to monitor a change in position of the first and second sensors relative to one another to monitor a change in tension of the strap.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a side view of a strap assembly in accordance with an embodiment of the present invention, secured about an item of cargo on a vehicle;

Figure 2B:
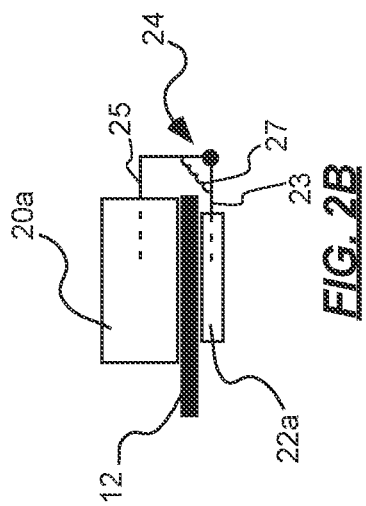
FIG. 2B is a sectioned view of the strap and sensor assembly of FIG. 2A, taken along section B-B of FIG. 2A.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

As used herein, the singular forms "a" and "the" can include plural referents unless the context clearly dictates otherwise. Thus, for example, reference to "a sensor" can include one or more of such sensor.

As used herein, the terms "attached," "coupled," "fixed," etc., can be used to describe a condition in which two or more components are coupled to one another in such a manner that they function as intended: that is, the force required to uncouple the components is sufficiently large such that the components will remain attached to one another during the service for which they were designed. Unless indicated to the contrary, such "coupled" components can be separable if sufficient force is applied to the components. In some aspects of the invention, components are elastically fixed or coupled to one another and will remain fixed during the useful life of the product for which they are designed; however, they may be uncoupled from one another using an appropriate level of force (applied in an appropriate manner and location), and will return to an original configuration (e.g., a condition, state, shape, size, etc.), which existed prior to the components being coupled to one another.

As used herein, the term "substantially" refers to the complete or nearly complete extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

INVENTION

As is generally illustrated in the figures, and discussed in more detail below, the present technology provides a system for monitoring tension in a strap system that can be advantageously used to secure a wide variety of items of cargo during transportation. The strap system is well suited for use in consumer applications (e.g., pick-up truck beds, trailers, etc.), commercial applications such as trucking, railroad, marine- and air-craft, etc. While basic "tie-down" systems have been used with some success in the past, they suffer from a number of disadvantages.

For example, one problem that can arise from these conventional systems is that the straps, while secure initially, can become loosened as the vehicle vibrates or is jarred either through micro-movements caused by the vibration, or by plastic deformation or other slippage which may occur when the load is jarred. Once the strap system becomes loosened, the integrity of the tie-down is significantly compromised due to any number of factors. One factor which compromises the tie-down's integrity arises from the fact that, after the tie-down becomes loosened, the position of the straps may more easily shift relative to the load, which may allow the load to shift relative to the straps and/or vehicle.

An additional factor arises when, once the tie-down is loosened, any subsequent shifting or jarring of the cargo allows for the cargo to accelerate for a small distance prior to engagement of the strap and thereby apply a dynamic load to the strap which may result in tie-down failure. The foregoing examples are not intended to recite an exhaustive list of reasons why a loose tie-down may be inadequate, rather, they merely illustrate that it is generally undesirable to have loose tie-downs on a piece of cargo.

The present invention addresses this and other issues by providing a system that can easily and accurately monitor the tension in any given strap assembly. The present system can be used with currently available strap systems, and does not require specialized straps or specialized hooks, ratchets, etc. The system is simple enough to allow use by non-commercial users yet reliable enough to be used by commercial enterprises.

The present system accomplishes this through a series of sensor or sensor assemblies that can be easily attached to an already-tensioned strap. The sensors can be attached at any location along the strap, and can be easily moved or removed, as any particular situation dictates. The system can communicate with a simple communication device, such as a cellular device, for ease of use by a variety of differing users.

Turning now specifically to the figures, FIGS. 1 and 2 illustrate en exemplary embodiment of the invention which includes a restraint assembly 10. The restraint assembly can include at least one strap 12 that can be secured to a vehicle 14 via hooks, clamps, ratcheting devices, etc., 16, 18. A unit or item of cargo is shown by example at 50. In a typical scenario, the strap 12 is positioned about the cargo 50, then securely tensioned into position (via tensioning devices not shown in detail), as would be evident to anyone of ordinary skill in the art.

Once the strap is tensioned into position, one or more sensors 20*a*, 20*b*, etc., can be attached to the strap at strategic locations. The sensors can have the capability of determining a relative position of the sensors and to transmit data relating to this relative position. In the example shown, for example, when initially installed, the sensors are about the same height from the vehicle bed 14, and are separated by a distance or displacement "$D_1$." As the vehicle is operated, if the strap tension is maintained as desired, the distance $D_1$ will not change significantly. However, should the strap become loosened over time, the distance $D_1$ will fluctuate as the strap oscillates due to movement of the vehicle. As the system can continuously monitor location of the sensors 20*a*, 20*b*, etc., the distance $D_1$ can be continuously calculated. If the system detects that the distance is too great, too small, or too variable, an alert can be sent to the driver and the driver can pull over and re-tension the load.

Figure 2A:
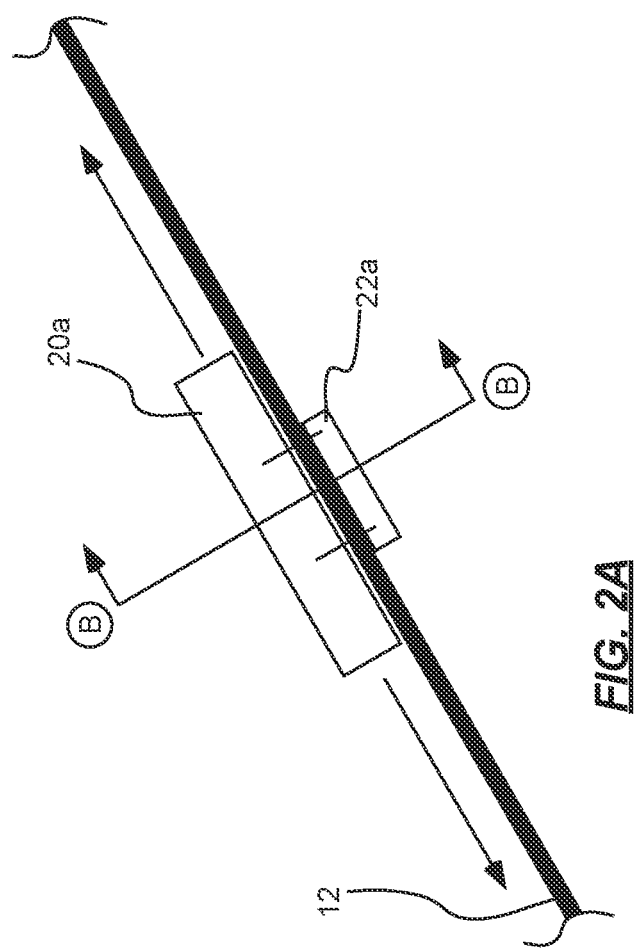
FIG. 2A is a more detailed view of a section of a strap of FIG. 1, with a sensor assembly attached thereto.

FIGS. 2A and 2B illustrate attachment of the sensor 20a to the strap 12 in more detail. In the example shown, the sensor is essentially placed atop the strap, and an attachment assembly 22a is used to secure the sensor to the strap. The attachment assembly is generally releasable, so that the sensors can be easily removed for use on the next load, and easily repositioned to provide the driver with flexibility in installing the sensors. In the example shown, the attachment assembly can include a clamp spring and hinge assembly 24. The clamp spring assembly can include a lower arm 23, an upper arm 25 and a spring 27 that biases the arms toward one another. A user can separate the upper and lower arms relatively easily to install the assembly over the strap, but once released the spring clamps the strap 12 between the assembly 22a and the sensor 20a.

Various other mechanisms can be employed to secure the sensor to the strap. Such mechanisms can ensure, depending upon the embodiment, that the sensor is securely attachable to the strap, that a position of the sensor can be easily adjusted, and that the sensor can be easily attached and removed. For example, hook-and-loop components can be utilized to securely attach the sensors to the strap.

The various electronic components utilized to effectuate the system can be selected from components known to those of the ordinary skill in these areas. The sensor can utilize or access GPS data to identify location, or can utilize relative positional technology to simply monitor distance from one sensor to another. Varied wireless technology can be employed to track position, determine relative position, transmit and receive data relating to position, etc., as would occur to one of ordinary skill in the art in such systems.

Figure 3:
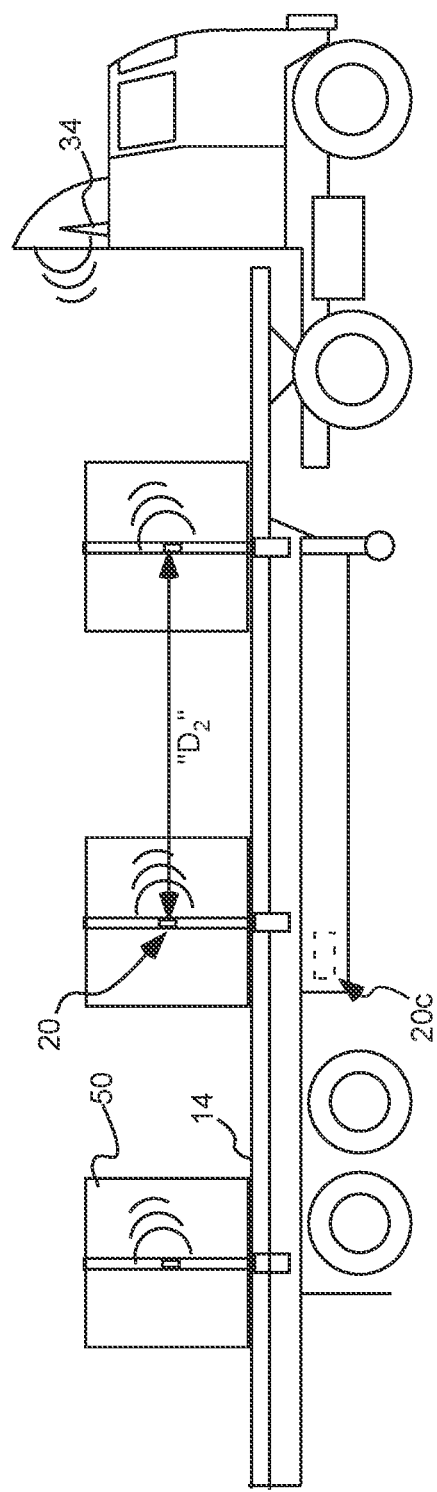
FIG. 3 is a side view of a vehicle having several items of cargo secured thereto, with a series of sensors attached to straps securing the cargo.
Figure 4:
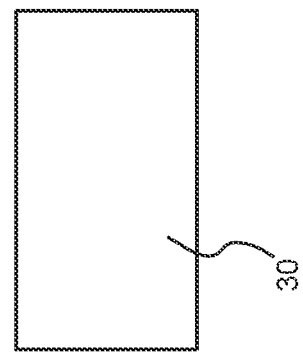
FIG. 4 is a schematic view of a personal communication device communicating with a control system in accordance with an embodiment of the invention.

For example, the system can include a processor 30 (FIG. 4) that can be located in a variety of positions: it can be carried by the sensor or sensor assembly; can be part of a communication device 32 (FIG. 4); or can be located remotely at, for example, a dispatch area that monitors activity of a number of vehicles. As shown for example in FIG. 3 the vehicle 14 can include a transmitter/receiver 34 that can transmit data from the sensors 30 remotely, where desired, to allow tension (e.g., relative position) to be monitored remotely. A similar scheme can be accomplished using cellular data. A comparator, or a circuit operable to function as a comparator, can be carried by any of the sensors, processor, transmitter/receiver, etc.

While tracking and/or computing of global positioning of the sensors can be utilized to calculate the positions of two or more sensors relative to each other, such global data is sometimes only a means to an end. It is not necessary in all embodiments for the present invention to function properly. As such, "local" sensors such as generally available range finders can also be used, so long as the change in position of one sensor relative to another can be detected and monitored.

In addition to tracking variations of distances between two or more sensors, the system can also monitor fluctuations or cyclic changes between two sensors. For example, regardless of how tight a strap may be installed over cargo, there will be some relative movement of the strap, and thus sensors, even if it is very small. This relative movement will likely appear as a frequency affected by the tension in the strap. This known relative movement can be established as a baseline, and the system can send an alert in the case a deviation in the frequency or magnitude of this movement is detected.

The system can be initially calibrated by a user at the site of the vehicle. Once a strap is manually verified to be sufficiently taut, the system can be "tared" to indicate that this condition is the normal or desired condition. As an example, a driver of a commercial transport vehicle can ensure the strap is tightened to the proper degree and then place his or her vehicle into service at a known speed. Once initially reaching this service speed, the system can be "tared" to note that any variation in location of the sensors is within normal operating expectations. After this, the system can alert the driver if the monitored, relative distance between sensors exceeds this norm in either amplitude or frequency.

While some embodiments utilize two fully functional sensor assemblies, each mounted to a unique position on the strap, in some embodiments only a portion of the sensing assembly is attached to a strap. For example, a portion of the sensing assembly 20c (shown schematically at 20c in FIG. 3) can be carried by the vehicle and/or trailer. This component may be more or less permanently attached to the vehicle and can be capable of sensing a distance from the component 20c to each of the various sensor components 20a, 20b, etc. As the sensor component 20c is fixed relative to the trailer, any movement between it and the strap sensor components will be a result of the strap moving relative to the trailer bed. In this manner, more expensive and/or complex and/or fragile components of the sensing system can be housed in a protective area on or in the trailer, and the removable sensor components on the straps can be made smaller, less expensive and less complex.

Thus, in some cases, reference herein to "a sensor" may include only or more components of the overall sensor system. For example, only a receiving or only a sending unit may be attached to a strap, while an associated sending or receiving unit may be attached to the vehicle itself.

In addition to the structural elements discussed above, the present technology also provides a method of monitoring a tension in a strap secured about a cargo item on a vehicle. The method can include: removably attaching at least a first sensor to the strap, the first sensor capable of determining a relative position of the first sensor and to transmit data relating to said first relative position; sensing relative position of at least a second sensor operable to determine a relative position of the second sensor; and comparing a position of the first and second sensors relative to one another to monitor a change in position of the first and second sensors relative to one another to monitor a change in tension of the strap.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A strap restraint monitoring system operable to monitor tension in at least one strap securing a cargo item to a vehicle, the monitoring system comprising:
   a first sensor, operable to determine a relative position of the first sensor and to transmit data relating to said first relative position;
   an attachment assembly, operable to adjustably attach at least a portion of the first sensor to a strap;
   a second sensor operable to determine a relative position of the second sensor; and
   a comparator, operable to compare a position of the first and second sensors relative to one another.

2. The system of claim 1, wherein the at least a portion of the first sensor is attachable to the strap in a continuously variable number of positions.

3. The system of claim 1, wherein the at least a portion of the first sensor is removably attachable to the strap.

4. The system of claim 1, wherein the attachment assembly includes a clamp engageable with the strap.

5. The system of claim 1, wherein both the first and second sensors are attachable to the strap.

6. A restraint assembly, comprising:
a cargo item secured to a vehicle with at least one strap;
a first sensor assembly including a first sensor and a first attachment assembly, the first sensor assembly operable to determine a relative position of the first sensor and to transmit data relating to said relative position, at least a portion of said first sensor assembly being secured to the strap by the first attachment assembly at a first location on the strap;
a second sensor assembly including a second sensor and a second attachment assembly, the second sensor assembly operable to determine a relative position of the second sensor and to transmit data relating to said relative position, at least a portion of said second sensor assembly being secured to the strap at a second location on the strap by a second attachment assembly; and
a comparator, operable to compare a position of the first and second sensors relative to one another.

7. The system of claim 6, wherein the first sensor is attachable to the strap in a continuously variable number of positions.

8. The system of claim 6, wherein the first sensor is removably attachable to the strap.

9. The system of claim 6, wherein at least one of the first attachment assembly and the second attachment assembly includes a clamp engageable with the strap.

10. The system of claim 6, wherein both the first and second sensors are attachable to the strap.

11. A method of monitoring a tension in a strap secured about a cargo item on a vehicle, comprising:
sensing relative position of at least a first sensor attached to the strap in a first position;
sensing relative position of at least a second sensor attached to the strap in a second position; and
comparing the relative positions of the first and second sensors to monitor a change in position of the first and second sensors relative to one another to monitor a change in tension of the strap.

12. The method of claim 11, wherein the first sensor is attachable to the strap in a continuously variable number of positions.

13. The method of claim 11, wherein the first sensor is movably attachable to the strap.

14. The method of claim 11, wherein the first sensor is clamped to the strap.

* * * * *